INVENTOR.
Jay R. Petree

Aug. 26, 1958  J. R. PETREE  2,849,597
EXPLOSION PROOF LIGHTING UNIT
Filed Oct. 2, 1956  3 Sheets-Sheet 2
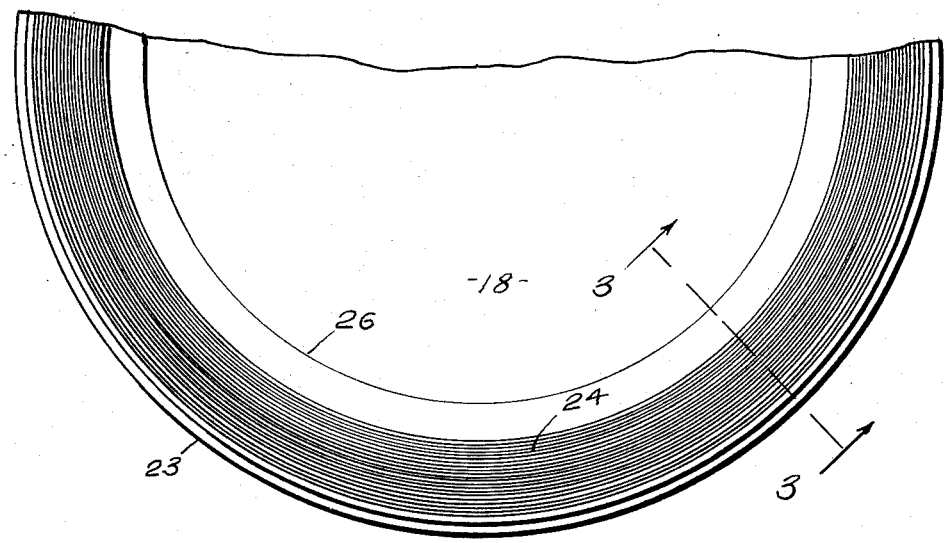
Fig-2-
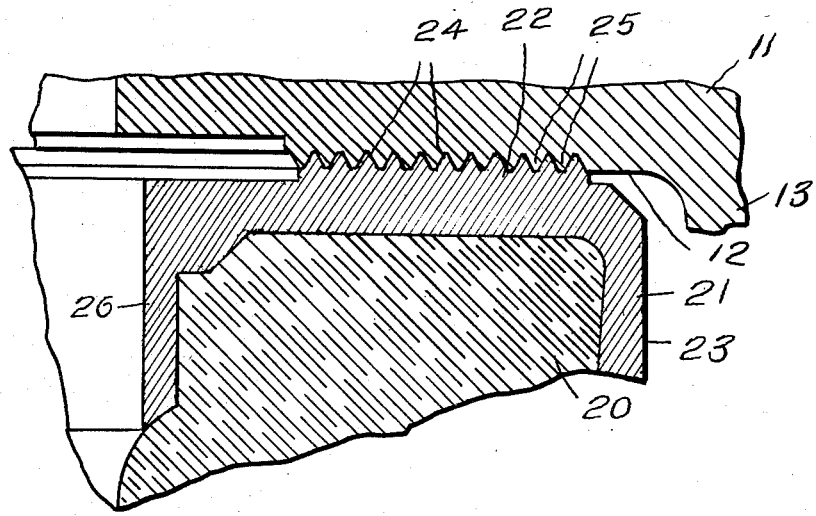
Fig-3-
INVENTOR.
Jay R. Petree
BY
 Emmett Thompson
ATTORNEY.

Aug. 26, 1958     J. R. PETREE     2,849,597
EXPLOSION PROOF LIGHTING UNIT
Filed Oct. 2, 1956     3 Sheets-Sheet 3
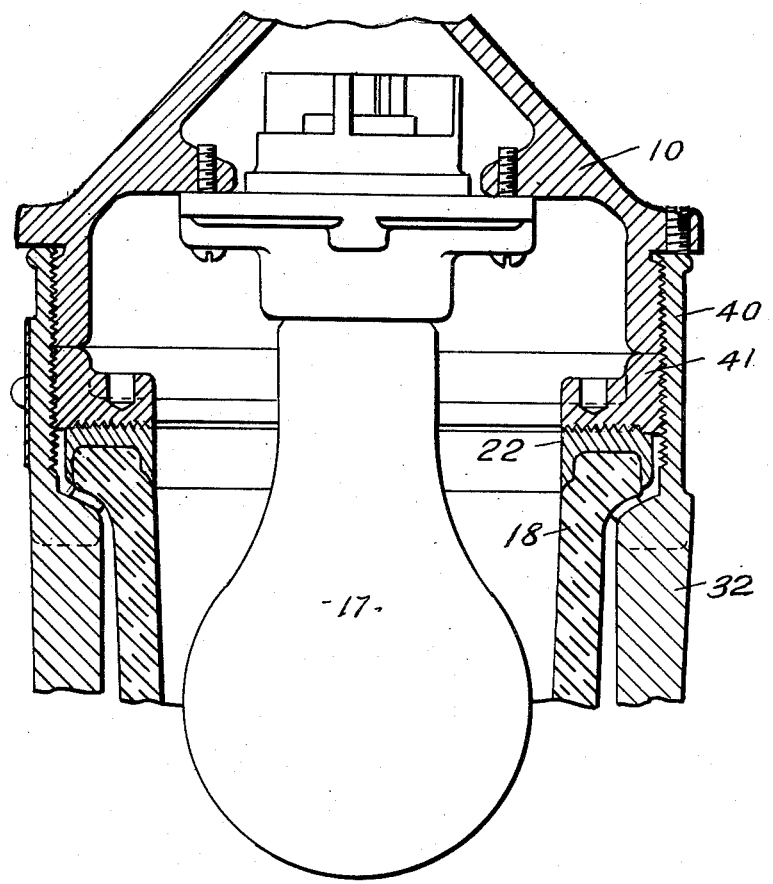
Fig-4-
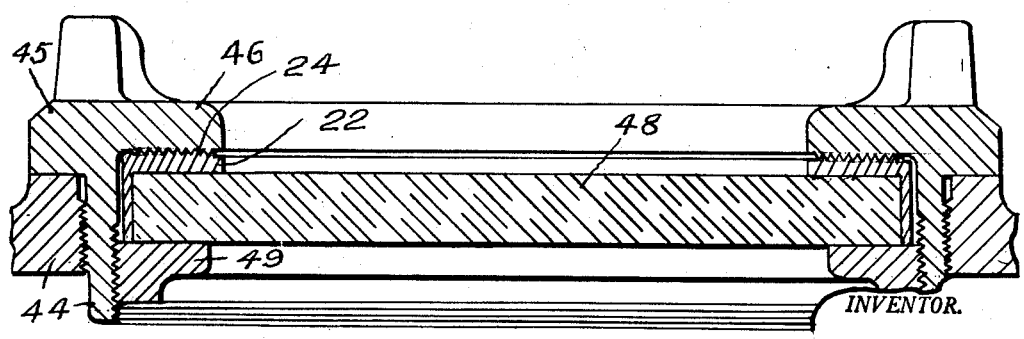
Fig-5-
INVENTOR.
BY Jay R. Petree
D. Emmett Tompson
ATTORNEY.

the sealing member is cast directly on the glass closure member, it has intimate contact therewith and, to a considerable extent, becomes bonded thereto.

United States Patent Office 2,849,597
Patented Aug. 26, 1958

2,849,597

EXPLOSION PROOF LIGHTING UNIT

Jay R. Petree, Fayetteville, N. Y., assignor to Crouse-Hinds Company, Syracuse, N. Y., a corporation of New York Application October 2, 1956, Serial No. 613,566

5 Claims. (Cl. 240—11.2)

This invention relates to a flame tight glass to metal joint for explosion proof housings for electrical apparatus. In such explosion proof housings, it is often necessary that the closure for an opening in the housing be formed of glass in order to provide for visual inspection of indicating instruments mounted in the housing, or for enclosing electric lamps. It is necessary that the glass closure, or the glass portion of the closure, be secured to the housing, or the closure mounting member, in proper flame tight relation, and that the structure of the joint between the metallic member and the glass closure member be such that the joint will be maintained throughout the life of the unit.

It has been found impractical to establish a proper joint between the open end of the globe and the body by providing the globe with a ground surface and the body with a machine surface. A joint of this arrangement can not be maintained due to the expansion and contraction of the parts resulting from the wide temperature range these units are subjected to in operation. Various types of gaskets have been used to effect a proper joint between the globe and the body of the unit but have not proven satisfactory due to the deterioration of the gasket material and for other causes.

These difficulties in establishing a proper flame tight joint between the glass and metal members exists particularly with gases which, when ignited, produce higher explosion pressures and with a flame more difficult to extinguish, such as hydrogen and acetylene. The exceedingly high pressures tend to separate the joined parts so as to permit a passage between the flat ground surfaces for the escape of the ignited gases.

This invention has as an object a flame tight joint structure between metal and glass members which does not add materially to the cost of the manufacture of the unit, and which functions to provide a flame tight joint under all conditions of temperature variations and pressures.

The invention consists in the novel features and in the combinations and constructions hereinafter set forth and claimed.

In describing this invention, reference is had to the accompanying drawings in which like characters designate corresponding parts in all the views.

In the drawings—

Figure 2 is a fragmentary plan view of the sealing member carried by the globe.

Figure 3 is an enlarged sectional view on line 3—3, Figure 2.

Figure 4 is a vertical sectional view of a modified form of lighting unit.

Figure 5 is a sectional view of a housing closure employing a flat glass closure disk.

Figure 1:
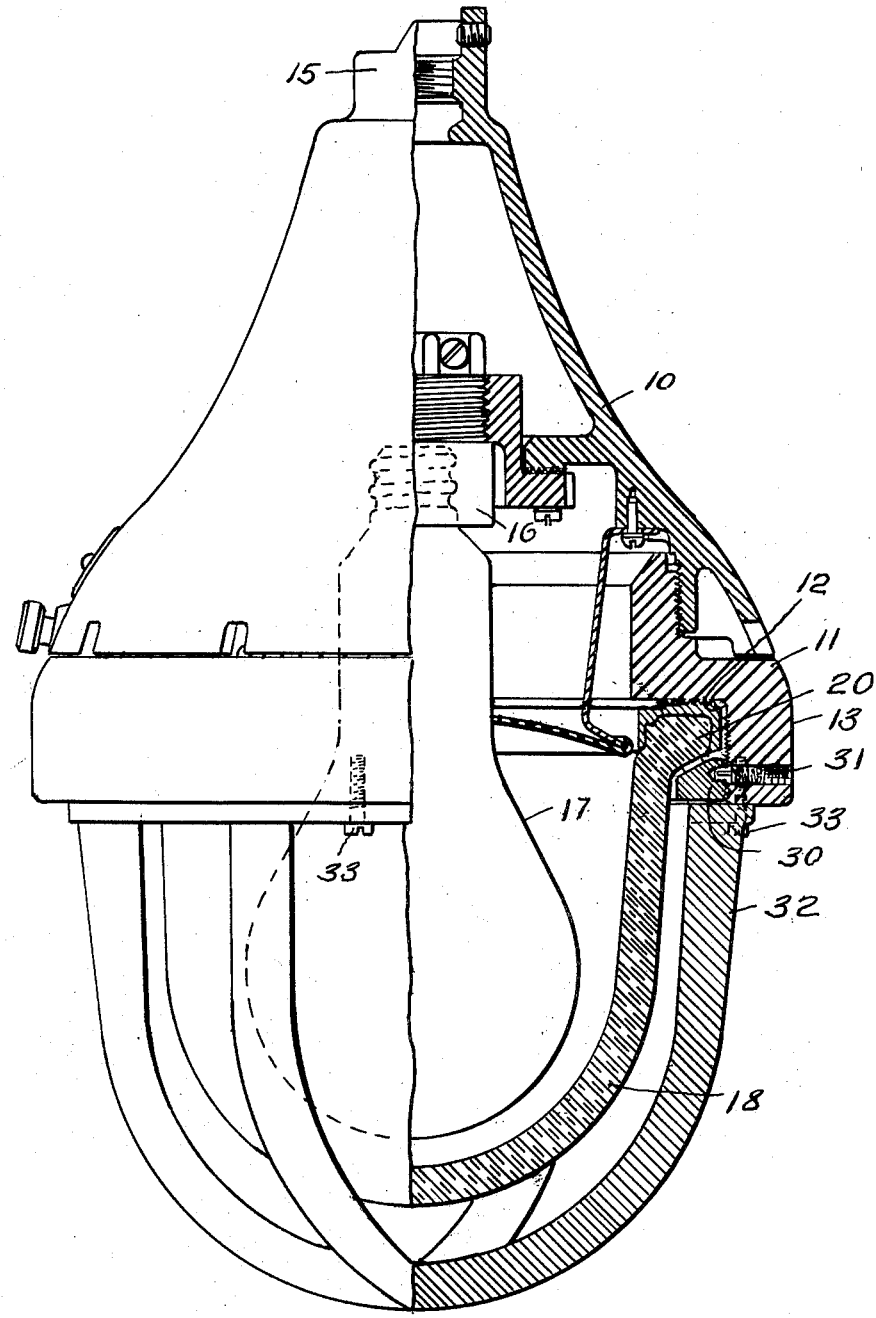
Figure 1 is an elevational view of a lighting unit, partly in section, embodying my invention.

Referring to Figures 1, 2 and 3 of the drawings, the housing is shown in the form of a lighting unit which consists of an upper canopy member 10 and an annular member 11 detachably secured to the lower open end of the canopy 10, as by being threaded thereto. The member 11 is formed with a flat annular radial surface 12 encircled by a depending cylindrical flange 13. The upper end of the body is formed with means for flame tight attachment to a conduit line. As here shown, this means consists of an internally threaded hub 15. A lamp receptacle 16 is mounted in the body, and the lamp is indicated at 17.

A bowl shaped globe 18, formed of glass, is secured to the open end of the body and serves to enclose the lamp 17. The upper open end of the globe is formed with a radial flange 20, the periphery 21 of which is inclined downwardly and slightly towards the axis of the globe. The flange 20 provides a flat radial surface complemental to the surface 12.

A sealing member is positioned on the open end of the globe 18 in intimate contact therewith. This sealing member is formed by being cast on the open end of the globe and is formed with a radial portion 22 and an outer portion 23 depending from the portion 22 and encircling the peripheral surface 21 of the flange 20. After the sealing member is cast on the globe and solidifies, it is machined to provide a plurality of radially spaced apart circular ribs 24, and the annular radial surface 12 of the body of the unit is machined to provide a series of ribs 25 complemental to the ribs 24.

Preferably, the sealing member may also be formed with an inner depending portion 26 overlying the inner surface of the globe and which serves to better affix the sealing member to the globe for the machining of the ribs 24. The sealing member is cast from relatively soft metal such as lead, or metal alloy such as type metal, the latter being preferred because of its better machining properties which result in a more precise formation of the ribs 24.

The globe with the sealing member affixed thereto is positioned against the annular surface 12 at the open end of the body and is clamped thereagainst by a ring 30 threaded into the depending cylindrical flange 13 and engaging the under side of the radial flange 20 formed at the open end of the globe. A suitable gasket may be interposed between the flange 20 and the ring 30. The globe is thus sealed in the annular member 11, and the ring 30 may be locked against retrograde movement, as by set screw 31. This assembly is made up at the factory and is not disturbed during the relamping of the unit inasmuch as the annular member 11 is secured to the upper canopy portion 10 by being threaded thereto. A suitable guard 32, for protecting the globe 18, may be attached to the flange 13, as by screws 33.

Referring to Figure 4, the globe is mounted in the guard unit 32, the upper end of which is formed with an internally threaded cylindrical flange 40 threaded upon the canopy 10 of the housing. The sealing member is engaged by an annular metallic member 41 threaded into the flange 40, whereby the globe is sealed in flame tight relation within the flange 40, the assembly constituting a closure for the open end of the body 10.

In Figure 5, the housing 44 is provided with a circular opening threaded internally to receive an annular metallic member 45 formed with an inwardly extending radial flange 46, the under surface of which is formed with the concentric ribs 24. The closure is completed by a glass disk 48, the marginal radial surface of which has cast thereon the sealing member 22. The disk 48, with the sealing member 22, is maintained in assembled relation in the member 45 by an annular nut 49.

Inasmuch as the sealing member is cast directly on the glass closure member, it has intimate contact therewith and, to a considerable extent, becomes bonded thereto.

Because the machining of the ribs 24 is done after the sealing member has been cast on the globe, the ribs are of precise formation and not subject to subsequent change, whereby the joint between the sealing member and the annular members 11, 41, 46, is at all times maintained in gas tight relation, thereby assuring that no gases will escape to the outer atmosphere resulting from an explosion within the lighting unit.

What I claim is:

1. A flame tight glass to metal joint for explosion proof electrical apparatus, an annular metallic member having flat radial annular surface, a glass closure member having a flat radial annular surface complemental to the annular surface of said metallic member, an annular metallic sealing member cast on said annular surface of said glass member, said sealing member having a radial portion coextensive with the annular surface of said metallic member for abutting thereagainst, said sealing member having an outer portion engaging the periphery of the annular surface of said glass member, the abutting surfaces of said sealing member and said metallic member being formed with a plurality of complemental interfitting concentrically disposed ribs, and an annular member having threaded engagement with said metallic member and engaging said glass closure member for clamping said sealing member in tight abutting relation to said annular surface of said metallic member.

2. A flame tight glass to metal joint structure for explosion proof electrical housing closures, an annular metallic closure member formed with a flat radial annular surface, a glass closure member having a flat radial annular surface complemental to the annular radial surface of said metallic member, an annular metallic sealing member cast on said annular surface of said glass member and having a radial portion for abutting against said annular radial surface of said metallic member, and also having an outer portion engaging the periphery of said glass closure member, the abutting surfaces of said sealing member and said metallic member being formed with a plurality of complemental interfitting concentrically disposed ribs, and an annular member having threaded connection with said metallic annular member and engaging said glass closure member for clamping said sealing member in tight abutting relation to said annular surface of said metallic member.

3. A flame tight glass to metal joint for explosion proof electrical apparatus comprising a housing formed with an opening, an annular metallic member threaded into said opening and having a radial flat surface, a glass closure member having a flat annular radial surface complemental to the radial surface of said metallic member, an annular metallic sealing member cast on said glass member and having a flat radial portion for abutting against said annular surface of said metallic member, said sealing member also having an outer portion encircling the periphery of said glass closure, the abutting portions of said sealing member and said metallic member being formed with a plurality of complemental interfitting concentrically disposed ribs and an annular member having threaded connection with said metallic annular member and engaging said glass closure member for clamping said sealing member in tight abutting relation to said annular surface of said metallic member.

4. An explosion proof lighting unit comprising a body open at one end and having means at its opposite end for flame tight attachment to a conduit line, said body being formed at its open end with a flat annular radial surface encircled by a depending cylindrical flange, a glass globe open at one end and having a radial flange encircling said open end, a metallic sealing member of relatively soft metal cast on the open end of said globe, said sealing member having a radial portion for abutting against said annular surface of the body, and said sealing member having inner and outer portions overlying the inner surface of the globe and the peripheral surface of the flange thereof, the abutting portions of said annular surface of the body and said sealing member being formed with a plurality of complemental interfitting concentrically disposed ribs, and means carried by said cylindrical flange of the body and engaging the flange of said globe for maintaining said sealing member in tight abutting relation to the annular surface of said body.

5. A metal to glass flame tight joint for explosion proof housings for electrical apparatus, a metallic member formed with a circular opening and having an annular radial surface encircling said opening, a glass closure of circular form for said opening and having an annular radial surface complemental to said annular surface of said metallic member, a metallic sealing member cast on the annular surface of said closure and having a radial portion for abutting against said annular surface of said metallic member, said sealing member also having an outer portion encircling the periphery of said closure, the abutting surfaces of said metallic member and said closure being formed with a plurality of complemental interfitting concentrically disposed ribs, and means cooperable to clamp said closure, sealing member and metallic member in assembled relation, and for maintaining said sealing member in tight abutting relation to the annular surface of said metallic member.

References Cited in the file of this patent

UNITED STATES PATENTS

| | | |
|---|---|---|
| 2,051,479 | Hastings | Aug. 18, 1936 |
| 2,070,195 | Bissell et al. | Feb. 9, 1937 |
| 2,089,049 | Benjamin | Aug. 3, 1937 |
| 2,295,339 | Ericson | Sept. 8, 1942 |
| 2,339,670 | Benson | Jan. 18, 1944 |